A. E. BRAINARD.
PUZZLE.
APPLICATION FILED MAR. 18, 1916.

1,188,035.

Patented June 20, 1916.

Inventor:
Adelbert Erastus Brainard
By Louis M. Schmidt
Atty.

THE COLUMBIA PLANOGRAPH CO., WASHINGTON, D. C.

UNITED STATES PATENT OFFICE.

ADELBERT ERASTUS BRAINARD, OF PORTLAND, CONNECTICUT.

PUZZLE.

1,188,035.  Specification of Letters Patent.  Patented June 20, 1916.

Application filed March 18, 1916. Serial No. 85,027.

*To all whom it may concern:*

Be it known that I, ADELBERT ERASTUS BRAINARD, a citizen of the United States, residing at Portland, in the county of Middlesex and State of Connecticut, have invented certain new and useful Improvements in Puzzles, of which the following is a specification.

My invention relates to improvements in puzzles, and the object of my improvement is to produce a puzzle or game suitable for amusement or entertainment, involving the combination of a cylindrical cage-like structure with perforated side walls and one or more balls positioned initially on the outer side thereof, the holes being for the most part too small to permit the passage of the balls therethrough, one or more of which are of sufficient diameter to permit the ball or balls to pass therethrough, the object sought being to transfer the ball or balls from the said outer side to the inner side of the cage or cylinder.

Figure 1:
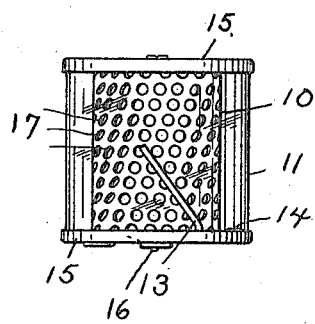
Figure 2:
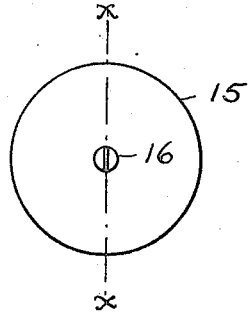
Figure 3:
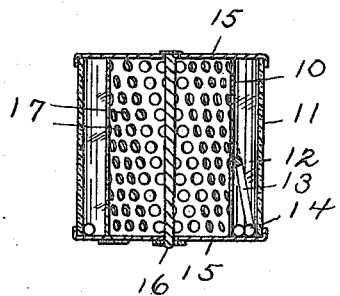
Figure 4:
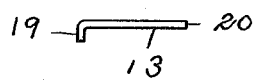
Figure 5:
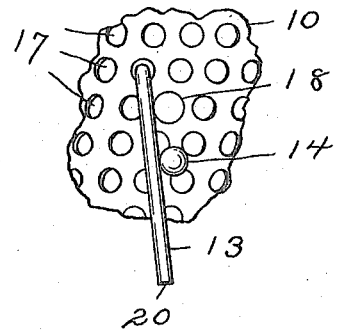

In the accompanying drawing:—Figure 1 is a front elevation of my improved puzzle. Fig. 2 is a plan view of the same. Fig. 3 is a sectional view on the line $x$ $x$ of Fig. 2. Fig. 4 is a plan view of the guide member. Fig. 5 is a fragmentary view on an enlarged scale showing part of the barrel or cage member, the guide member, and one of the balls in the position for use.

My improved puzzle comprises a cylindrical, barrel-like cage 10, having a perforated side wall, inclosed by a cylindrical glass wall 11 and separated therefrom by an annular space 12, and in which space is housed a guide member 13, which is permanently retained in the said space, and in which space there is initially housed one or more balls 14, which ball or balls may be transferred through the operation of my puzzle to the inner side of the said barrel 10.

Heads 15 close the ends of the barrel 10 and fit over the ends of the glass inclosure 11, being held in place by a central shaft 16.

The barrel 10 is preferably made of perforated tubing, whereby the perforations are evenly distributed over the entire wall structure, and the said perforations comprise a relatively large number of holes 17 which are of less diameter than that of the balls 14 by a small amount, but of course sufficient to prevent the said balls 14 from passing therethrough, and one or more holes 18 of larger diameter than that of the said balls 14, preferably however only by a small amount, but sufficient to permit the passage of the balls therethrough. Accordingly, by manipulating the device so as to bring the balls in registration with the larger hole or holes 18 the balls will pass through the wall of the barrel 10 into the interior space inclosed thereby.

In some cases I have made an operative device using steel balls or shot $\frac{1}{16}$ of an inch in diameter, and having the smaller holes 17 of one thousandth of an inch smaller diameter and the larger holes 18 larger than the diameter of the balls by the same amount, and by having about 230 of the smaller holes 17 and a single hole 18 of larger diameter. I also prefer to use three balls 14.

In order to facilitate bringing the balls 14 into registration with the different holes I provide the guide member 13. The said guide member 13 is formed of a piece of wire of slightly less diameter than the small holes 17, and comprises a generally straight body portion of sufficient length to extend along a plurality of holes 17, and having near one end a right angle bend forming a short hook-like lateral arm 19 suitable for hooking into any one of the holes 17 or 18.

The device as described is closed and self-contained, and while all operations are visible, there is no access to the interior space inclosed by the glass wall 11, and the heads 15, so that operation of the device is effected by manipulating the same in various ways, turning in one direction or the other. The first step is to position the guide 13 so that a ball may be moved along the body portion thereof. In placing the guide 13 as mentioned, the branch arm 19 is hooked in one of the holes 17, the body portion extending along a plurality of holes, the end 20 of the said body portion, remote from the branch 19, resting on one of the heads 15.

By patience and perseverance, involving in some cases trying a ball in a large part of the entire set of holes, ultimately the particular hole 18 will be located that will permit the passage of the ball, the incentive being the positive statement that the device is operable.

I claim as my invention:—

1. A puzzle comprising a cylindrical barrel, an inclosing glass wall in spaced relation to the said barrel, a ball housed in the space between the said barrel and glass wall, and the side wall of the said barrel having a set of perforations of slightly smaller diameter than that of the said ball and having a perforation of slightly larger diameter than that of the said ball.

2. A puzzle comprising a cylindrical barrel, an inclosing glass wall in spaced relation to the said barrel, a ball housed in the space between the said barrel and glass wall, the side wall of the said barrel having a set of perforations of slightly smaller diameter than that of the said ball and having a perforation of slightly larger diameter than that of the said ball, and guide means also loosely housed in the said space, suitable for facilitating the bringing of the said ball into registration with the said perforations.

3. A puzzle comprising a cylindrical barrel, an inclosing glass wall in spaced relation to the said barrel, a ball housed in the space between the said barrel and glass wall, the side wall of the said barrel having a set of perforations of slightly smaller diameter than that of the said ball and having a perforation of slightly larger diameter than that of the said balls, and a guide also housed in the said space, the said guide comprising a piece of wire having a body portion suitable for extending along a plurality of the said holes and having a hook at one end for engaging with the said holes.

ADELBERT ERASTUS BRAINARD.

Witnesses:
B. E. SPENCER,
LOUIS M. SCHMIDT.

Copies of this patent may be obtained for five cents each, by addressing the "Commissioner of Patents. Washington, D. C."